Oct. 25, 1966     W. J. GILMORE     3,281,571

FLEXIBLE CONDUIT ASSEMBLY FOR WELDING APPARATUS

Filed Dec. 8, 1964     3 Sheets-Sheet 1

INVENTOR.
WILLIAM J. GILMORE

BY

ATTORNEYS

Oct. 25, 1966  W. J. GILMORE  3,281,571
FLEXIBLE CONDUIT ASSEMBLY FOR WELDING APPARATUS
Filed Dec. 8, 1964  3 Sheets-Sheet 2
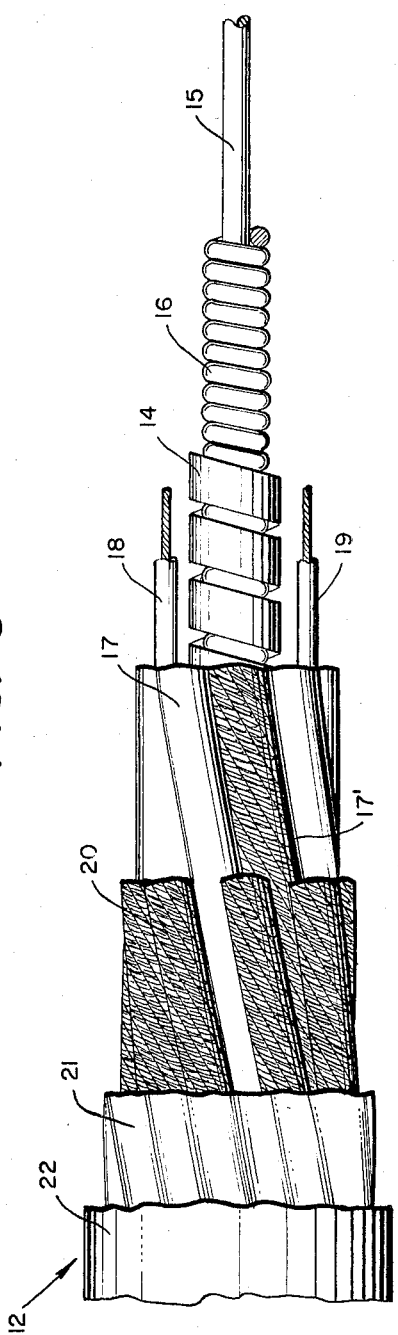
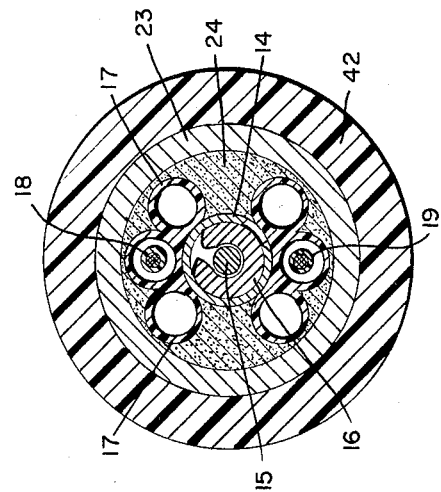
*INVENTOR.*
WILLIAM J. GILMORE
BY
ATTORNEYS

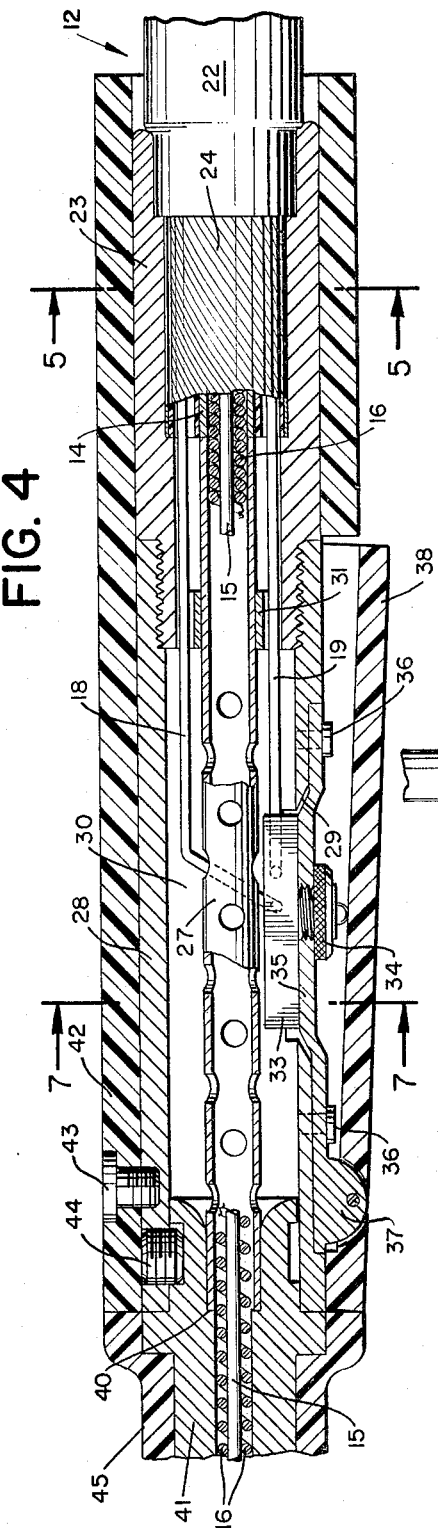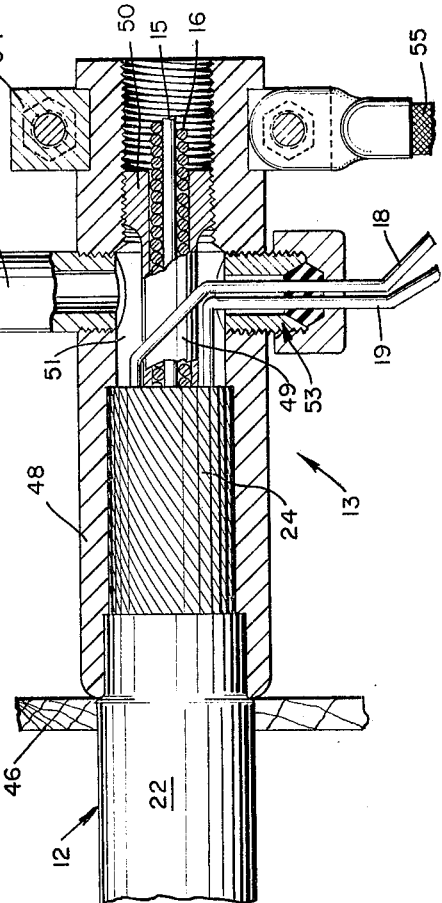

United States Patent Office 3,281,571
Patented Oct. 25, 1966

3,281,571
FLEXIBLE CONDUIT ASSEMBLY FOR
WELDING APPARATUS
William J. Gilmore, Manitou Beach, Mich., assignor to
American Chain & Cable Company, Inc., New York,
N.Y., a corporation of New York
Filed Dec. 8, 1964, Ser. No. 416,823
13 Claims. (Cl. 219—130)

This invention relates to welding apparatus and more particularly to a composite flexible conduit assembly for use in welding machines.

Arc welding apparatus usually includes a flexible conduit which leads from a torch head where welding is effected to the welding machine at which sources of gas, electricity and welding wire are provided. In conventional flexible conduit assemblies, separate conduits for gas, electricity, circuit wires, and the consumable welding wire have all been grouped parallel to one another within a jacket. This grouping of the respective conduits to form a single flexible assembly has several shortcomings. The assembly itself is generally bulky, difficult to bend, and far less flexible than desirable, and the juncture of the individual conduits at the torch head results in a bulky handle which is relatively unwieldy. It is an object of this invention to provide welding apparatus having the gas, electrical and welding wire facilities positioned in a novel structural arrangement which gives a composite flexible welding conduit with improved flexibility characteristics, unique positioning of the facilities at the torch head for correct functioning of the apparatus, and simplicity of construction which lends itself to manufacture by efficient stranding techniques.

Broadly stated, the invention provides a flexible conduit assembly for use in a welding machine which comprises a wire guide axially positioned within the assembly for containing a welding wire and a plurality of conduit means positioned concentrically about the wire guide. A plurality of electrical conductors are positioned concentrically about the conduits and an outer jacket surrounds the electrical conductors. The flexible conduit assembly is particularly useful in combination with welding apparatus having a torch head mounted on the flexible conduit. The invention also provides means for connecting the assembly to the torch head which comprises a gas chamber in which the ends of the gas-conveying conduits terminate, and electrical shunt means connected to the electrical conductors and defining the gas chamber. Means are provided for directing the welding wire from the wire guide to the torch head which is partially opened to the chamber to receive gas from the chamber, and an insulated casing surrounds the shunt means.

The location of the welding wire guide tube along the central axis of the composite flexible conduit with the gas conveying means and the electrical conductor wires wound helically about the guide tube in separate layers, produces a flexible conduit with the smallest possible cross-sectional area and positions the moving welding wire along the neutral bending axis thus facilitating axial displacement of the wire. Perhaps most importantly, the individual layers of the composite structure can be formed on a production scale with modern stranding and extrusion steps. Of course, the particular structure described gives compactness and flexibility not heretofore realized in similar welding apparatus, thereby greatly increasing its utility.

A preferred embodiment of the invention is described hereinbelow with reference to the drawings wherein:

FIG. 3 is a fragmentary longitudinal elevation progressively broken away of the end portion of the flexible welding conduit of the invention;

FIG. 4 is a side elevation partly in section and partly broken away of the torch head attachment assembly;

FIG. 5 is a section taken along the line 5—5 of FIG. 4;

FIG. 6 is a side elevation partly broken away of the attachment means for the assembly remote from the torch head; and FIG. 7 is a section of the torch head attachment assembly taken substantially along lines 7—7 of FIG. 4.

Figure 1:
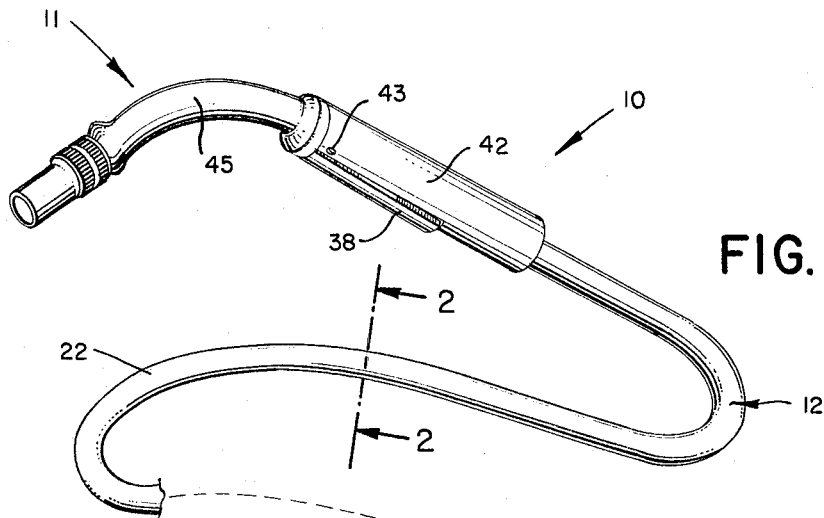
FIG. 1 is a fragmentary perspective partly broken away of the welding apparatus of the invention.
Figure 2:
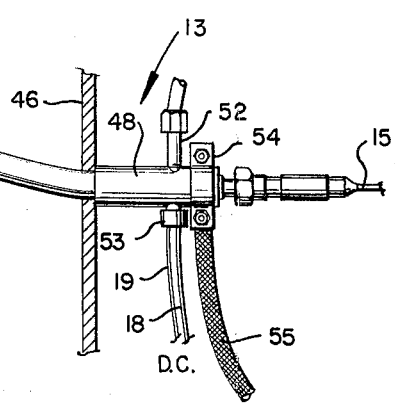
FIG. 2 is a section of a flexible welding conduit taken substantially along the line 2—2 of FIG. 1.
Figure 2:
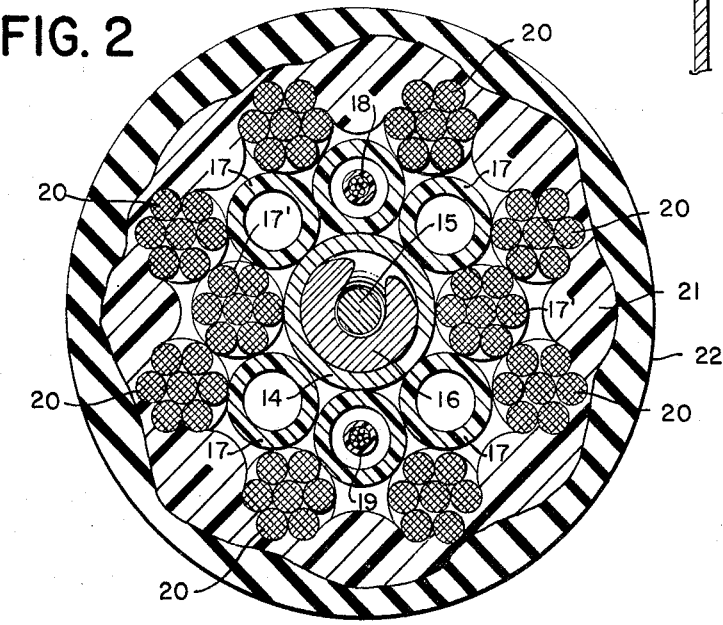

Arc welding apparatus 10 as shown in FIG. 1 is basically comprised of a torch head 11, a flexible conduit assembly 12 and a welding machine 13. The flexible conducit assembly 12 shown in FIGS. 2 and 3 comprises a wire guiding tube 14 which is positioned in the center of the flexible conduit assembly 12 and substantially defines the axis of the assembly. The wire-guiding tube 14 is preferably a helically wound open-turn flat wire coil, which in the example shown has an inside diameter of 0.185 inch and an outside diameter of 0.230 inch. Alternatively it may be a plastic tube, preferably of nylon. Positioned within the wire guide conduit 14 and axially extending throughout the length of the conduit is a welding wire 15. The material from which the welding wire is constructed is dependent, of course, upon the type of arc weld being made. The diameter of a steel welding wire in this example may be 0.060 inch. Mounted within the wire-guiding tube 14 and about the welding wire 15 is Bowden-type liner 16. This Bowden-type liner is a single closed turn wire spring which provides a replaceable liner for adapting the wire-guiding tube 14 to welding wires of various diameters. As will be described subsequently, the Bowden spring liner 16 is space wound at the torch end to permit passage of gas therethrough. In this example the spring liner 16 was formed from a wire with a diameter 0.050 inch into turns having an outside diameter of 0.160 inch. When softer welding wires such as aluminum are used it may be advantageous to use a liner made of a resinous plastic.

Stranded about the wire-guiding tube 14 at approximately a 10° helical path are eight elements consisting of six plastic conduits 17 which serve principally as gas-conveying conduits in this application, though in other applications they might also be used for conveyance of coolant, and two diametrically opposed 7 x 95 x 36 rope lay copper conductors 17'. The conduits 17 are preferably made of nylon and are used for conveying inert gas from the welding machine 13 to the torch head 11. In this example the plastic conduits 17 have an outside diameter of 0.140 inch and an inside diameter of .095 inch. Positioned within two of the six conduits 17 are plastic-insulated stranded trigger circuit wires 18 and 19. In this example these wires have a diameter of 0.050 inch and lead from the welding machine 13 to a trigger switch adjacent the torch head 11. Helically stranded in the valleys between the six conduits 17 and two conductors 17' are eight 7 x 43 x 36 rope lay copper conductors 20.

Extruded about the gas-conveying conduits 17 and conductors 17' and 20 is an intermediate jacket 21 of polyvinylchloride which holds the inner elements together during the final assembly steps of the conduit. The extrusion is such that the jacket 21 is thicker between the eight conductors 20 than it is directly over them. Extruded about the intermediate jacket 21 and defining an outer jacket 22 is a sheath of synthetic rubber preferably made from chlorosulfonated polyethylene. Other plastics which can be used for the outer jacket are polyurethane, polyethylene and polypropylene.

In FIGS. 4, 5, and 7, a torch head attachment assembly is shown which includes an end terminal on the extremity of the conduit assembly 12. The terminal comprises a bushing 23 of a copper-lead-zinc alloy having suitable mechanical and electrical properties. To install the terminal the outer and intermediate jackets 22 and 21 are stripped away from the end portion of the assembly 12 to expose the conduits 17 and conductors 17' and 20. Inner mandrel supports are inserted within the tube 14 and conduits 17 and the bushing 23 is then fitted about them. The bushing 23 is reduced in diameter about one sixteenth of an inch so as to compress the conductors 17' and 20 into an apparently homogenous condition as shown in FIG. 5 with the bushing and conductors of the conduit in good electrical contact and the jacket 22 of the conduit gripped securely. The inner configuration of the conduits 17 and the wire-guiding tube 16 remains substantially the same in the compressed end portion 24 as they are elsewhere in the assembly 12.

Extending outwardly through the bushing 23 from the compressed end portion 24 of the conduit are the wire liner 16 and the welding wire 15. Abutting against the outer end of the wire-guiding tube 14 and having substantially the same inner diameter is a perforated cylinder 27 through which the liner 16 (which is broken away in FIG. 4) and the welding wire 15 are directed to the torch head. Threaded onto the bushing 23 and extending axially therefrom about and spaced in relation to the perforated cylinder 27 is a shunt extension sleeve 28. The shunt extension sleeve 28 is substantially cylindrical with the exception of a cutout portion 29 along one side. The bushing 23 and the shunt extension sleeve 28 have an inside diameter which is greater than the outside diameter of the perforated cylinder and provide a sufficient space about the cylinder to permit the gas to be conveyed from the conduits 17 into the defined space which functions as a gas chamber 30.

The circuit wires 18 and 19 also extend axially from the assembly 12 and into the gas chamber 30. A spider 31 which is provided to hold the perforated cylinder 27 properly positioned within the gas chamber 30 has openings 32 formed therein which permit the circuit wires 18 and 19 to by-pass the cylinder and also permit the gas to flow freely through the gas chamber. The circuit wires 18 and 19 are attached to a trigger switch box 33 to which is operatively connected a trigger switch 34. The trigger switch 34 is mounted on a switch plate 35 which substantially closes the cutout portion 29 formed in the shunt extension sleeve 28 and is attached to the shunt extension by fasteners 36. A pivotal mount 37 is provided on one end of the switch plate 35 and has a switch lever 38 pivotally supported thereon which permits the switch 33 to be actuated by pivoting the lever into abutting contact with the switch.

An end 40 of the perforated cylinder 27 is inserted within an opening in a conductive tip 41 of the torch head. The liner 16 and the welding wire 15 extend beyond the end 40 of the perforated cylinder 27 to the end of the tip 41 where the arc welding takes place. It is to be noted that the liner 16 is spaced wound in this region to permit the passage of gas to the tip where the weld is to take place. Surrounding the bushing 23 and the shunt extension sleeve 28 is a substantially cylindrical insulated outer protective grip 42. The grip 42 is cylindrical with the exception of the portion thereof which is defined by the lever 37 and is secured to the shunt extension 28 by screws 43. The shunt extension 28 is secured to the tip 41 by means of set screws 44. Surrounding the tip 41 and extending to the end of the torch head is a curved neck 45. In operation the gas is conveyed into the gas chamber 30 and is forced between the spaces of wound liner 16 to the tip where the weld takes place.

At the machine end shown in FIG. 6, the flexible conduit assembly 12 extends through a casing 46, which is a protective enclosure for the welding machinery, into a swaged stepped diameter conductive bushing or sleeve 48 (similar to the bushing 23) in compressed intimate electrical contact therewith to form a terminal. In the same manner as in the torch head attachment assembly, circuit wires 18 and 19 extend from the remainder of the conduits as does the liner 16 and the welding wire 15. A guide sheath 49 has a larger diameter end portion 50 which is in tight engagement with the conductive sleeve 48 so as to define a gas chamber 51 between the end 49 of the flexible conduit and the end portion 50. Extending through the wall of the conductive sleeve 48 is a gas supply tube 52 which supplies the inert gas from a suitable source. Also extending through the wall of the conductive sleeve 48 is a gland assembly 53 through which the circuit wires 18 and 19 extend to the control source. Mounted about the end of the conductive sleeve 48 is an electrical contact clamp 54 which has a cable 55 extending therefrom to a source of electrical energy.

In operation the inert gas is fed into the welding machine end of the conduit through the tube 52 into the gas chamber 51. The electric current is transmitted through the sleeve 48 to the conductor wires 20 from the cable 55. The inert gas is then fed axially through the conduits 17 to the torch head, and the electric current passes to the torch head by means of the helically wrapped conductors 17' and 20. The welding wire 15 is inserted through the guide tube 14 and liner 16 from a supply roll adjacent the welding machine end to the torch head. It can be appreciated, as shown in the drawing, that all the necessary supplies for effecting welding at the torch head are conveyed from the welding machine end through a conduit assembly possessing the ultimate in compactness. At the torch end, the gas is fed from the conduits 17 into the gas chamber 30. The electrical current is shunted to the torch tip 41 from the conductors 17' and 20 through the terminal bushing 23 and shunt extension 28. The liner 16 and the welding wire 15 are supported in the gas chamber 30 by means of the perforated cylinder 27. The gas fed into the chamber 30 passes through the perforations in the cylinder and follows the wire 15 as it is conveyed to the torch head to effect arc welding in the usual manner. The circuit wires 18 and 19 lead through two of the conduits 17 from the welding machine end to the gas chamber 30 at the torch end where they are connected with the trigger switch 33 by means of which the actuation of the welding machine can be controlled.

One of the most significant aspects of this conduit assembly design is that it can be fabricated entirely on modified stranding apparatus. The wire-guiding tube 14 is fed axially through a planetary stranding head and an extruder. At the stranding head, the conduits 17 and the conductors 17' and 20 are laid helically about the tube 14 in a closing die and the assembly passes through the extruder where the intermediate jacket 21 is applied. The assembly is subsequently directed through a second extruder where the outer jacket 22 is applied and the finished conduit assembly issues continuously from the fabricating apparatus in indefinite lengths. Thereafter, the circuit wires 18 and 19 are pushed or pulled through their conduits 17.

I claim:

1. A flexible conduit assembly for use in welding apparatus comprising:
   (a) a wire guide axially positioned within the assembly for containing a welding wire,
   (b) a plurality of gas-conveying conduits helicaly wrapped about said wire guide,
   (c) a plurality of electrical conductors helically wrapped about said conduits and
   (d) an outer packet surrounding said electrical conductors.

2. A flexible conduit assembly according to claim 1 which includes at least one end terminal comprising electricaly conductive bushing means fitting tightly about said conductors at an end portion of the assembly where said outer jacket is removed, the conductors being in a compacted condition within the terminal and said wire guide and conduits being of substantially the same inner configuration within the terminal as elsewhere in the assembly.

3. A flexible conduit assembly according to claim 1 in combination with a torch head mounted on the assembly and including means for connecting the assembly to the torch head.

4. A flexible conduit assembly for use in welding apparatus comprising:
   (a) a wire-guiding tube axially positioned within the assembly for containing a welding wire,
   (b) a plurality of gas-conveying conduits and first electrical conductors helically wraped about said tube,
   (c) a plurality of second electrical conductors helically wraped about said conduits and first electrical conductors,
   (d) intermediate means surrounding said conduits and conductors for holding them positioned about said tube, and
   (e) an outer jacket surrounding said intermediate means.

5. A flexible conduit assembly for use in welding apparatus comprising:
   (a) a wire-guiding tube axially positioned within the assembly,
   (b) a plurality of conduits and a plurality of first stranded electrical conductors for conveyance of inert gas helically wrapped about said tube,
   (c) an electrical circuit wire positioned in at least one of said gas-conveying conduits for transmitting current to control means,
   (d) a plurality of second stranded electrical conductors helically wrapped about said conduits and first electrical conductors,
   (e) an intermediate jacket surrounding said gas-conveying conduits and conductors for holding them positioned about said wire-guiding tube, and
   (f) an outer packet surrounding said conductor wires.

6. A flexible conduit assembly for use in welding apparatus comprising:
   (a) an open-turn helically formed flat wire-guiding tube axially positioned within the assembly,
   (b) a plurality of plastic conduits for conveyance of inert gas and a plurality of stranded rope lay first electrical conductors helically wrapped side-by-side about said tube,
   (c) insulated electrical circuit wires positioned in two of said gas-conveying conduits for transmitting current to control means,
   (d) a plurality of spaced stranded rope lay second electrical conductors helically wrapped in the valleys between said conduits and first conductors,
   (e) an intermediate plastic jacket surrounding said gas-conveying conduits and conductors for holding them positioned about said wire-guiding tube,
   (f) an outer plastic jacket surrounding said conductors.

7. A flexible conduit assembly according to claim 6 wherein six gas-conveying conduits, two diametrically opposed first conductors, and eight second conductors are included.

8. A flexible conduit assembly according to claim 6 which includes end terminals comprising electrically conductive bushing means fitting tightly about said gas-conveying conduits and first and second conductors at end portions of the assembly where said intermediate and outer jackets are removed, said conductors being in a compacted condition within said terminals and said wire-guiding tube and gas-conveying conduits being of substantially the same inner configuration within said terminals as elsewhere in the assembly.

9. A combination according to claim 3 wherein said means for connecting said assembly to the torch head comprises:
   (a) electrical shunt means connected to said electrical conductors and defining a gas chamber in which said gas-conveying conduits terminate,
   (b) means for directing the welding wire from the wire guide to the torch head which is partially open to said chamber to receive gas from the chamber, and
   (c) an insulated casing surrounding said shunt means.

10. A combination according to claim 9 wherein said means for directing the welding wire comprises a perforated cylinder positioned in said gas chamber which permits the wire to be fed axially to the torch head along with gas from the chamber.

11. A combination according to the claim 10 wherein a removable liner extends through said wire guide and said perforated cylinder and into said torch head about the welding wire.

12. In welding apparatus means for connecting to a torch head a conduit assembly containing gas-conveying means, a welding wire guide, and a plurality of electrical conductors comprising:
    (a) electrical shunt means connected to said electrical conductors and defining a gas chamber in which said gas-conveying means terminate,
    (b) means for directing the welding wire from the wire guide to the torch head which is partially open to said chamber to receive gas from the chamber, and
    (c) an insulated casing surrounding said shunt means.

13. Welding apparatus according to claim 12 wherein said means for directing the welding wire comprises a perforated cylinder positioned in said gas chamber which permits the wire to be fed axially to the torch head along with gas from the chamber.

References Cited by the Examiner
UNITED STATES PATENTS

| | | | |
|---|---|---|---|
| 2,795,689 | 6/1957 | McNutt | 219—125 |
| 3,098,892 | 7/1963 | Spade et al. | 174—47 |
| 3,112,392 | 11/1963 | Orr et al. | 219—130 |

RICHARD M. WOOD, *Primary Examiner.*